(12) United States Patent
Roberts et al.

(10) Patent No.: US 10,751,592 B1
(45) Date of Patent: Aug. 25, 2020

(54) PERIPHERAL VISUAL TRAINER AND PERIPHERAL VISUAL TRAINING SYSTEM

(71) Applicants: Keith Roberts, Dellwood, MN (US); Lee Erickson, Stillwater, MN (US); Ray Olson, Stillwater, MN (US)

(72) Inventors: Keith Roberts, Dellwood, MN (US); Lee Erickson, Stillwater, MN (US); Ray Olson, Stillwater, MN (US)

(73) Assignee: PERCEPTIVE SPORTS TECHNOLOGIES, LLC, Stillwater, MN (US)

( * ) Notice: Subject to any disclaimer, the term of this patent is extended or adjusted under 35 U.S.C. 154(b) by 276 days.

(21) Appl. No.: 15/932,406

(22) Filed: Feb. 26, 2018

(51) Int. Cl.
   *G09B 19/00* (2006.01)
   *A63B 69/00* (2006.01)
   *G06K 9/00* (2006.01)

(52) U.S. Cl.
   CPC .......... *A63B 69/00* (2013.01); *G06K 9/00597* (2013.01); *A63B 2220/12* (2013.01)

(58) Field of Classification Search
   USPC ..... 434/247, 251, 258; 2/410; 473/208, 209, 473/211, 438, 464; 600/587, 595
   See application file for complete search history.

(56) References Cited

U.S. PATENT DOCUMENTS

| | | | |
|---|---|---|---|
| 4,303,241 A | 12/1981 | Burroughs | 273/26 C |
| 5,150,104 A * | 9/1992 | Thomas | G01C 9/06 200/DIG. 2 |
| 5,300,921 A * | 4/1994 | Hoch | A61B 5/1121 340/573.6 |
| 5,916,181 A * | 6/1999 | Socci | A42B 3/0433 600/595 |
| 6,730,047 B2 * | 5/2004 | Socci | A61B 5/1114 600/595 |
| 7,326,060 B2 * | 2/2008 | Seiller | G09B 19/0038 351/203 |
| 7,509,691 B1 * | 3/2009 | Wingate | A42B 3/0473 2/411 |
| 8,062,037 B1 | 11/2011 | Chapa | 434/251 |
| 8,284,070 B2 * | 10/2012 | Chaudhari | G01C 9/00 340/573.1 |
| 8,568,256 B1 | 10/2013 | Richardson | 473/451 |
| 9,956,465 B1 * | 5/2018 | Rodriguez | A63B 71/0622 |
| 10,019,881 B2 * | 7/2018 | Chung | H04W 64/00 |
| 2007/0147027 A1 * | 6/2007 | Chuang | A42B 3/0453 362/106 |
| 2012/0157243 A1 * | 6/2012 | Gallo | A63B 69/0002 473/438 |
| 2012/0210498 A1 | 8/2012 | Mack | 2/214 |
| 2014/0115759 A1 * | 5/2014 | Tomlin | A63B 71/10 2/411 |

* cited by examiner

*Primary Examiner* — Kurt Fernstrom
(74) *Attorney, Agent, or Firm* — Johnson & Phung LLC

(57) ABSTRACT

A peripheral visual training system using a peripheral visual trainer that includes an orientation monitor operably mounted on an athlete's head or an a helmet that is secured to the athlete's head as the athlete participates in an activity to help the athlete develop his or her peripheral vision by alerting the athlete through an alarm to concentrate on using peripheral vision rather than central vision when the peripheral visual trainer detects the athlete is using central vision for an object that should be viewed using peripheral vision.

14 Claims, 4 Drawing Sheets

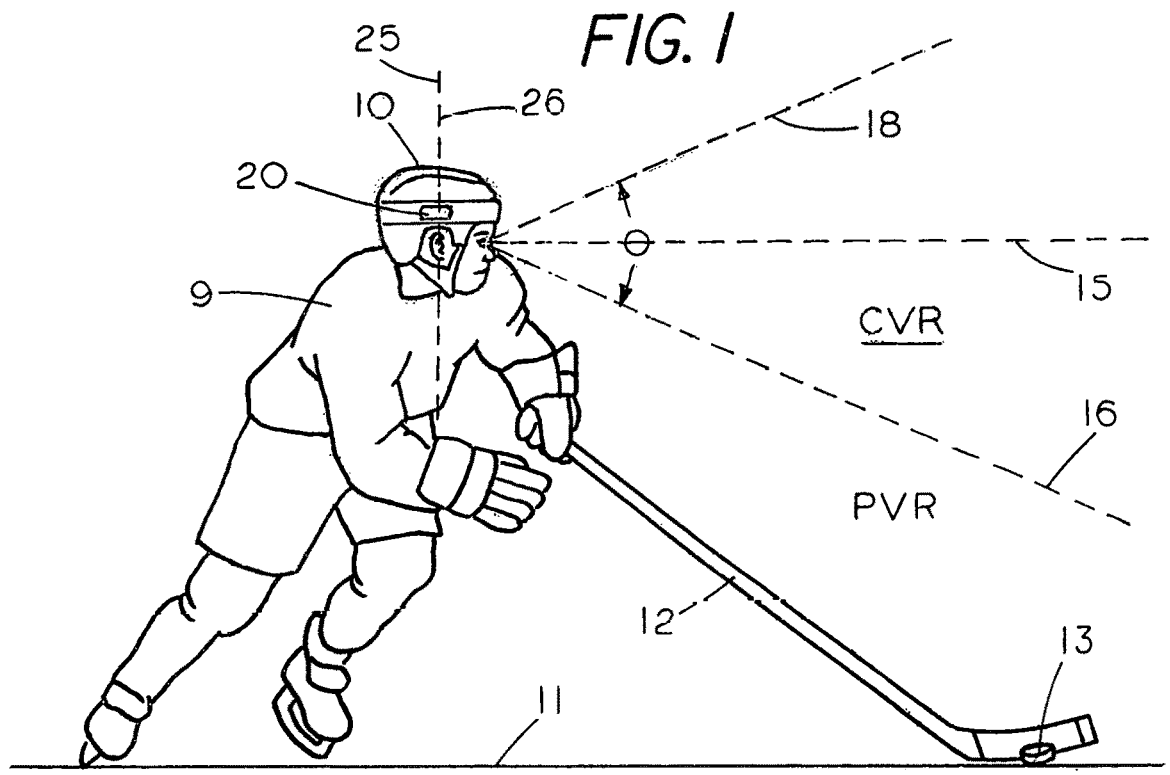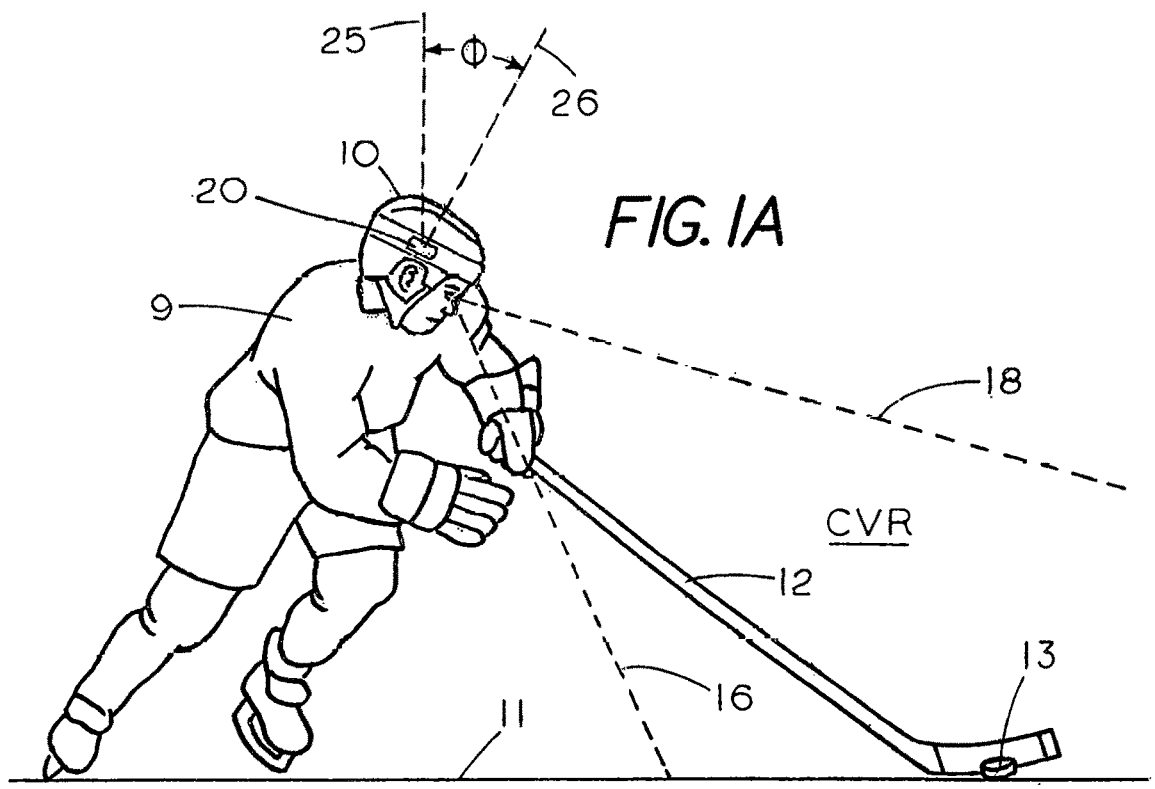

PERIPHERAL VISUAL TRAINER AND PERIPHERAL VISUAL TRAINING SYSTEM

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

Various type of athlete headgear having an attached device that performs some type of monitoring is known in the art.

Application US 20120210498 discloses a headgear sensor, an impact sensor and a device to measure the correct location of headgear on an athlete.

U.S. Pat. No. 4,303,241 describes a vision interrupting device which interrupts a player's vision of the ball so that the player can observe the trajectory of the ball for only a predetermined time after it is released.

U.S. Pat. No. 8,568,256 discloses an apparatus which helps provide contrasting colors to help one recognize the spin of a baseball.

U.S. Pat. No. 8,062,037 describes visual identifiers during game play and training exercises to improve vision, focus, and concentration including an American football having unique visual identifiers for use as an in-flight visual training tool.

SUMMARY OF THE INVENTION

The invention comprise a peripheral visual training system using a peripheral visual trainer that includes an orientation monitor operably mounted on the side of an athlete's head or an a helmet that is secured to the athlete's head as the athlete participates in an activity. The peripheral visual trainer helps the athlete develop his or her peripheral vision by alerting the athlete to concentrate on using peripheral vision rather than central vision when it detects the athlete is using central vision for objects that should be viewed using peripheral vision through an alarm activated when a downward head tilt of the athlete from the reference head position of the athlete is detected, the alarm alerting the athlete that an object viewable in the peripheral vision viewing region of the athlete has become viewable in the central vision viewing region of the athlete enabling the athlete to consciously restore head viewing position to the reference head position.

BRIEF DESCRIPTION OF THE DRAWINGS

FIG. 1 shows a hockey player skating and looking forward while wearing a peripheral vision-training helmet;

FIG. 1A shows the hockey player of FIG. 1 skating forward while looking downward while wearing a peripheral vision-training helmet;

DESCRIPTION OF THE PREFERRED EMBODIMENT

Figure 2:
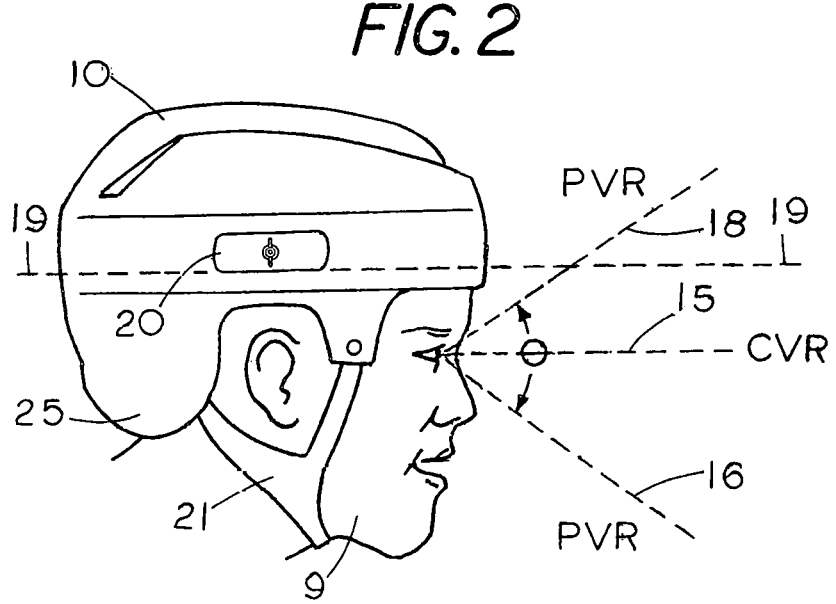
FIG. 2 shows a peripheral vision-training helmet with an orientation monitor showing the position of a hockey player's central viewing region (CVR) and the peripheral viewing region (PVR) as the hockey player sights forward along a horizontal line.

Peripheral vision is a key component to the development and success of an athlete in all types of sports including for example, football, soccer, golf, hockey, field hockey, rugby, tennis, baseball, skiing, basketball etc. In sports such as hockey where an athlete handles an object such as a puck the use of peripheral vision is particularly important since the ability to see what is going on around oneself without having to focus on the hockey puck is an important skill. In general, the more an athlete can develop his or her peripheral vision the better the athlete can see objects or persons around him or herself while viewing objects in front of the athlete. Increasing the ability to simultaneously see objects in both a central vision region and a peripheral vision region increases the effectiveness or proficiency of the athlete. That is, the more an athlete develops their peripheral vision, they better they are able to sense where teammates and opponents are located within field of play, and the more an athlete is aware of teammates or opponents the more proficient an athlete becomes. Also, in sports athletes may move at high velocities where player safety becomes important since well-developed peripheral vision can protect the athlete from injury through collision avoidance. Hockey is an example of a sport where an athlete moves at velocities as high as 30 MPH and athlete collisions can cause injury. Also with higher velocities, the less time the athlete has to react to pass, shoot, or simply avoid a high impact collision. Thus, both for reasons of athlete proficiency as well as for safety reasons an athlete needs to develop peripheral vision. For example, in sports such as hockey the athlete needs to control and slide a puck along the ice as well as shoot or pass the puck to various teammates, actions that require effective viewing of objects in the players central viewing region (CVR) and the players peripheral viewing region (PVR).

While static peripheral vision training may be used to enhance ones peripheral vision such training may not translate to game conditions. In the present invention the peripheral vision training is done on-the-go and under game conditions using a'vision training helmet 10 shown in FIG. 2. The helmet 10, which fits snugly to the users head, includes a chinstrap 21 that holds the vision-training helmet 10 in a fixed position with respect to the head of the hockey player 9. The peripheral visual trainer 20, which attaches to helmet 10 includes an orientation monitor 40 (see FIG. 6) for spatial position monitoring to detect any tilting or pivoting head movement of the hockey player, which immediately translates to movement of helmet 10. In this example, the orientation monitor 40 in the vision-training helmet 10 detects changes in the pitch of the helmet 10, which indicates that the hockey player is tilting his or her head in order to view an object in the central viewing region (CVR) rather than viewing the object in the peripheral viewing region (PVR). Oftentimes the hockey player may not know that he or she is tilting their head to avoid using their peripheral vision. With the present invention, which is done on-the-go, the vision-training helmet 10 immediately alerts the player through an alarm 47, which may be a visual alarm such as a light, a vibratory alarm, an audible alarm or any other alarm that spurs the player to concentrate on use of his or her peripheral vision. Consequently, the player immediately becomes aware of their failure to simultaneously use both the peripheral vision region (PVR) and central vision region (CVR). Once an alarm signal is detected the athlete can while on-the-go react by bringing his or her head into the correct viewing position.

The invention as described herein comprises a peripheral vision training system including a peripheral visual trainer 20 having a sensor or orientation monitor 40 (FIG. 6) operably mounted on the side of an athlete's head (FIG. 7) or alternatively on a helmet that is secured to the athlete's head as the athlete participates in an activity (FIG. 1 or FIG. 2). The peripheral visual trainer 20 helps the athlete develop his or her peripheral vision by alerting the athlete to concentrate on using peripheral vision rather than central vision as the athlete engages in a physical activity. During the activity the orientation monitor continually senses the athlete's head position with respect to a pre-established reference head position.

As shown in FIG. 1 and FIG. 2 the hockey player has a line of sight 15 that typically extends parallel to the horizon with an upper conical boundary 18 between the central viewing region CVR, and the peripheral viewing region (PVR) and a lower conical boundary 16 between the lower peripheral viewing region PVR and the central viewing region (CVR). In this example the player uses his or her central vision to view objects in the central viewing region (CVR) and his or her peripheral vision to view objects in the peripheral viewing region (PVR). While the angle θ of the central viewing region varies from person to person the relative position of the peripheral viewing region (PVR) to the central viewing region (CVR) remains the same.

FIG. 1 shows hockey player 9 skating with a peripheral vision-training helmet 10 for on-the-go peripheral vision training and FIG. 2 shows an isolated head view of peripheral vision-training helmet 10 with respect to a central viewing region (CVR) which has a conical shape, which is centered around an axis 15 extending forward from the fovea of the users eye. In this example the dashed line 18 represents the upper boundary of the conical central viewing region (CVR) and the dashed line 16 represent the lower boundary of the conical central viewing region (CVR). The region outside the central viewing region (CVR) comprises the hockey players peripheral viewing region (PVR).

FIG. 1 shows a vertical axis 25 coinciding with a central helmet axis 26. This view represents the preferred skating position for hockey player 9 since the players central viewing region (CVR) extends forward along a horizon line 15 to enable the hockey player to use his or her central vision to clearly see objects or persons in his or her path, while the puck 13 is viewed using the peripheral vision of the hockey player. This is the safe and most effective way to simultaneously skate forward while controlling the puck 13, which is located on ice 11.

FIG. 1A shows the hockey player of FIG. 1 skating forward while looking downward while wearing a peripheral vision-training helmet 10. This is a non-preferred position since the hockey player 9 tilts his head downward to bring objects on the ice 11 i.e. puck 13 into his central viewing range (CVR). The helmet axis 26, which is perpendicular to the peripheral vision-training helmet 10 extends outward at an angle 4) with respect to the vertical axis 25. The angle 4) represents the hockey player's head tilt when using the central viewing region to view an ice object, such as puck 13, rather than his or her peripheral vision. This view represents an unsafe and ineffective way to simultaneously skate forward while controlling the puck.

The purpose of the peripheral visual trainer 20 and in particular the peripheral visual training helmet 10 is to assist the hockey player to maintain his or her head in the position shown in FIG. 1 rather than the unsafe or less effective position illustrated in FIG. 1A.

Figure 2A:
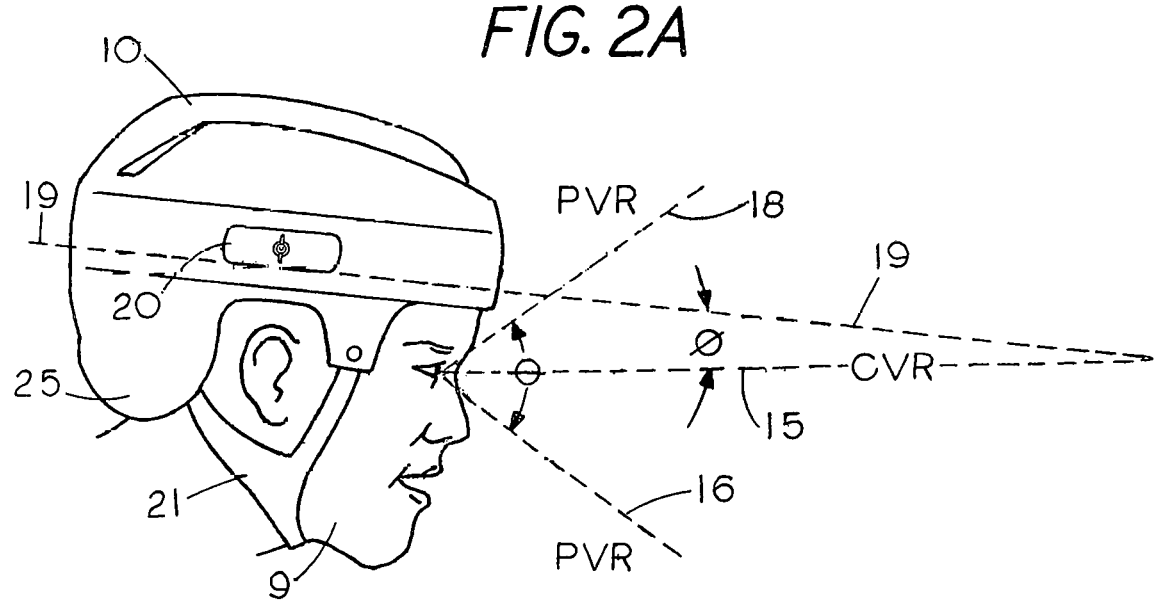
FIG. 2A shows a peripheral vision-training helmet with an orientation monitor showing the position of a hockey player's central viewing region (CVR) and the peripheral viewing region (PVR) where the hockey player has a natural head tilt as the hockey player looks forward along a horizontal line.

FIG. 2 illustrates a first step in the establishment of a "reference head position" which is used to determine head tilt of the hockey player. To obtain a reference head position the athlete 9 looks forward along a horizontal line of sight 15 while the athlete observes objects in both the peripheral viewing region (PVR) and the central viewing region (CVR). Viewing along a horizontal line 15 determines a static head position or head angle described herein as a "reference head position", which is thereafter used to detect changes in the players viewing field through head tilting. In this case the "reference head position" is a head position or head angle with respect to the horizon 15, that is a position where an athlete 9 can simultaneously view objects in both a central viewing region (CVR) and a peripheral viewing region (PVR) while looking straight ahead. In the example shown in FIG. 2 the reference head or natural viewing angle θ with respect to the horizon is 0 since a reference line 19 of the peripheral visual trainer 20 is parallel to the horizon line 15. Once the reference head position or head angle, i.e. the pitch of the head of the athlete with respect to the horizon, is experimentally determined the information on the reference head position, which represents proper use of central vision and peripheral vision, is either electronically stored in a processor 48 in the peripheral vision trainer 20 or manually set if the orientation monitor 40 in the peripheral vision trainer 20 is a level indicator (for example a liquid level switch). With a level indicator one manually establish the reference head position by rotating the peripheral vision trainer 20 to a level condition when the viewers sight is along a horizontal line 15 as shown in FIG. 2 and FIG. 2A. With a level indicator any head deviations of the peripheral vision trainer from the level condition indicate improper use of the player's central vision. While a liquid level switch is one example of an orientation monitor 40 other examples that can be used to detect head tilt or pitch other examples include gyroscopes, global positioning sensor (GPS) as well as a three axis accelerometer and no limitation is intended as to the scope of orientation monitors useable to detect head deviation from a reference head position. Although the aforementioned devices can be used to determine multiple types of head motion including pitch, yaw and roll, a feature of the invention described herein is that only the head pitch of the athlete (i.e. downward head tilting) is necessary to determine if a person has brought an object normally viewable in the peripheral viewing region into the central viewing region. Thus, a change in head pitch of the athlete is used to activate an alarm; however changing the viewing region from side to side does not activate the alarm unless the athlete tilts his or her head downward.

A feature of the invention describe herein is that the "reference head position" can be individualized for each person that uses the peripheral visual trainer 20 since the reference head position or head angle of each person is determined with respect to viewing along a horizontal line. FIG. 2A shows a person 9 with a natural or normal downward head tilt while looking along a horizontal line 15 while FIG. 2 shows a person who has no downward head tilt while looking along a horizontal line 15.

In FIG. 2A the hockey player 9 having a normal downward head tilt has a reference head position located at a natural viewing angle comprising an acute angle θ with respect to the horizon 15 while FIG. 2, where the player has no downward head tilt, the reference line 19 of the peripheral visual trainer 20 is parallel to the horizon 15.

Even though the hockey player shown in FIG. 2A has a downward tilt this is the "reference head position" that the hockey player should maintain during game activity in order to simultaneously view objects in both the central viewing region (CVR) and the peripheral viewing region (PVR). Thus, while one hockey player has one reference head position another hockey player may have a different reference head position. A feature of the invention described herein is that it takes into consideration the anatomy of each player since natural head tilt is taken into consideration when establishing a "reference head position" for the hockey player.

Once the "reference head position" is established as described herein the orientation monitor 40 (FIG. 6) is used to determine a downward tilting of the persons head from the reference head position since downward head tilt is an indication that the player is incorrectly viewing objects. That is the player 9 is relying on central vision rather than both central vision and peripheral vision. In the example shown in FIG. 1A, the athletes head tilts down from the "reference head position" which is illustrated in FIG. 1. In this case the orientation monitor 40 in the peripheral visual trainer 20 detects the deviation and provides immediate feedback to the athlete that his or her head is in an incorrect viewing position. With the aid of an alert generated by the peripheral visual trainer 20 an athlete can recognize the problem and on-the-go bring the head position to the pre-established reference head position where the athlete can optimally view objects in both a central viewing region (CVR) and a peripheral viewing region (PVR). The use of an alert or reminder encourages the athlete to consciously keep looking forward into their central viewing region (CVR) while relying on their peripheral vision for objects located outside their peripheral viewing region (PVR). The repeated reminders both consciously and unconsciously enhance the person's ability to use peripheral vision for objects not directly in the line of sight since the person is made aware of the incorrect viewing pattern.

FIG. 1, which shows hockey player 9 looking and skating in a forward direction while wearing a peripheral visual trainer 20 on peripheral vision-training helmet 10 that contains an internal orientation monitor 40 (FIG. 6) that detects head deviation from the "reference head position". FIG. 1 shows hockey player 9 engaged in multiple tasks that are best performed if the hockey player can effectively use his or her peripheral vision. That is, hockey player 9 controls hockey puck 13, which is located proximate the blade of hockey stick 12 and in the hockey player's peripheral viewing region (PVR) while at the same time the hockey player is cognizant of people and objects that are located in his central viewing region (CVR). In general for both safety and proficiency, hockey player 9 needs to be able to effectively use his or her peripheral vision to maintain the blade of hockey stick 12 on puck 13, which is located on a layer of ice 11 that is typically 3 to 5 feet below a horizontal line of sight 15 and in the peripheral viewing range (PVR) of the hockey player while at the same time the hockey player needs to use his or her central viewing region (CVR) to determine the location of opposing players, teammates and other objects in order to avoid collusions that could injure the hockey player. Since hockey players may be skating as fast as 30 miles per hour it becomes important that the hockey player is able to simultaneously see and react to objects in both the peripheral viewing region (PVR) and the central viewing region (CVR) since there is little time to change the player's viewing field through head tilting. For example, the time to change one's head position by tilting ones head downward in order to view objects, which are normally in the peripheral viewing region (PVR), in the central viewing region (CVR) can expose the player injury as well as cause deterioration in the level of play of the hockey player since player actions becomes momentarily delayed or adversely affected by a change in the players viewing field.

With the present invention an athlete can on-the-go enhance his or her peripheral vision through peripheral visual trainer 20. The peripheral visual trainer 20 provides an on-the-go detection that the athlete has tilted or moved their head in order to view an object in his or her central viewing region (CVR) rather than continue to view the object in his or her peripheral viewing range (PVR). Once the head tilting is detected the peripheral visual trainer 20 sends a signal alerting the player of the change in head position. Often times the athlete may not realize the head movement which changes the field of view, however, an alarm 47 (FIG. 6) in the peripheral visual trainer 20 alerts the hockey player to correct their head position. Thus, the peripheral visual trainer quickly makes the hockey player aware of a peripheral viewing problem so the hockey player can on-the-go correct the problem of ineffective use of peripheral vision.

In some types of peripheral visual trainers 20 one may want to use a liquid level switch as orientation monitor 40. If using a liquid level switch or the like one can manually rotate the peripheral visual trainer 20 to bring the liquid level switch to a level condition or horizontal condition within the peripheral visual trainer 20. In this case head tilting can be detected from a level condition even though the person may have a normal downward head tilt to his or head.

Figure 3:
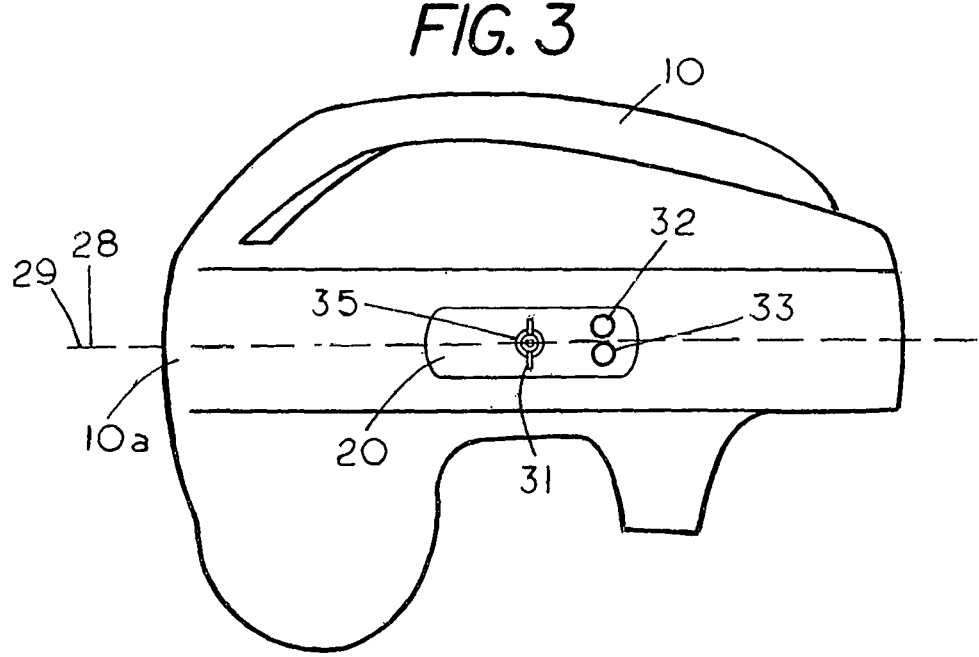
FIG. 3 is a side view of the peripheral vision-training helmet showing an orientation monitor secured to the helmet in a condition parallel to the horizon.
Figure 4:
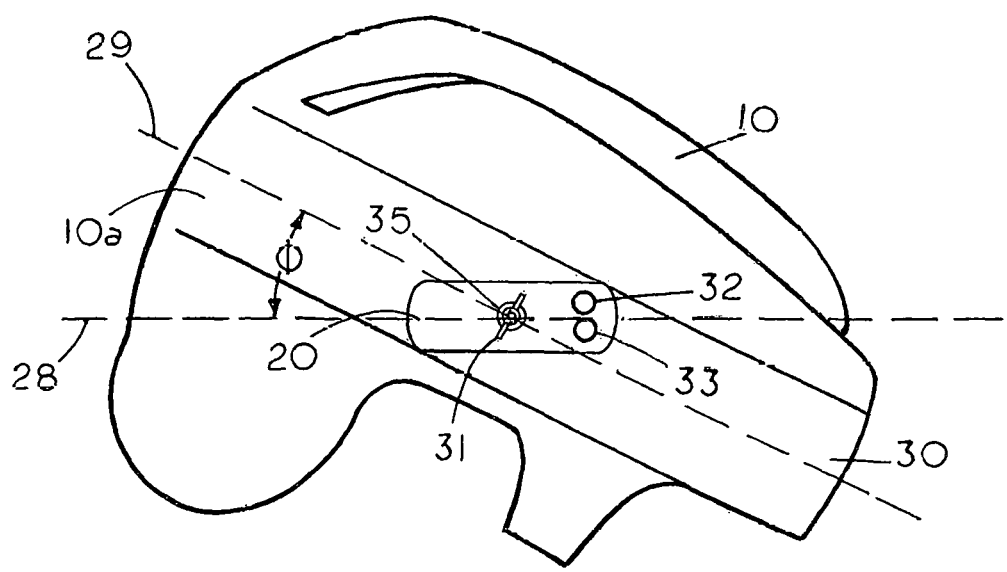
FIG. 4 is a side view of peripheral vision-training helmet of FIG. 3 showing the angular position of the orientation monitor with respect to the helmet after the orientation monitor has been rotated to adjust for the natural head tilt of a person.

FIG. 3 shows the peripheral vision-training helmet 10 for a hockey player that has no head tilt when viewing along a horizontal line while FIG. 4 shows the peripheral vision-training helmet 10 where the hockey player has a downward head tilt even though both the hockey player's eyes are viewing along a horizontal line. In either case the reference head position is established based on each users anatomy. Deviations from the reference head position, which will be an indication of the user tilting his or her head to view objects in the peripheral viewing region (PVR), can be detected by the orientation monitor 40 in the peripheral vision trainer 20. Once the deviation is detected the hockey player receives an alert either visual or audible reminding him or her to gaze forward rather than down and use their peripheral vision for objects outside the central viewing region (CVR). Thus, training to correct improper viewing occurs instantaneously.

Both FIG. 3 and FIG. 4 illustrate a helmet position where the peripheral visual trainer 20 provides feedback upon deviation from a head reference position, which is based on the degree of head tilt. In this example one may a determine a training position relative to the field of view or head position of the user through a processor 48 in peripheral vision trainer 20. In addition, the sensitivity or the amount head deviation from the training position that activates the alarm 47 can be increased or decreased through processor 48. For example, increased sensitivity to deviation from the training position i.e. the reference head position results in the athlete having to move his or her head very little to receive feedback from peripheral visual trainer 20. On the other hand a decrease in the sensitivity of the deviation from the training position would mean that the athlete could have greater head movement before they obtain feedback signal form the peripheral visual trainer 20. This feature allows the athlete to set the peripheral visual trainer 20 to a condition that works best for the user as well as to change the sensitivity of peripheral visual trainer 20 as the peripheral vision training progresses.

Figure 5:
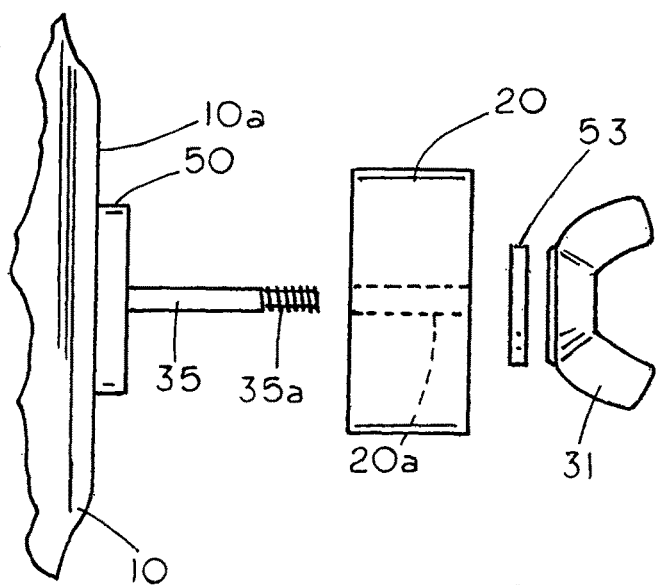
FIG. 5 shows a mechanical friction holder for changing and maintain the orientation of the peripheral visual trainer with respect to the vision-training helmet.

FIG. 5 is an exploded view showing that a base 50 that has one side fixedly attached to helmet 10 with the base 50 having a stud 35 with threads 35a that can be extended through a sleeve 20a in peripheral visual trainer 20. In this example the peripheral visual trainer 20 is frictionally secured in position through a washer 53 and a wing nut 31. This feature allows one to manually rotate and then lock the peripheral visual trainer 20 at the reference head position by merely tightening wing nut 31.

While the manual adjustment of the peripheral visual trainer 20 can be done manually as illustrated in FIG. 3 and FIG. 4, it can also be set electronically through switches 32 and 33, which connect to an internal processor 48. In each case the hockey player gazes along a horizontal line 15 to establish a reference head position. Once the reference head position is established the operator adjusts the processor settings through switches 32 and 33. For example, one may push switch 32 to deactivate the sensor 40 and switch 33 to electronically set the reference head position in sensor 40. In either case one enters the reference head position into the system based on the viewers head position so that deviations from the reference head position due to the player head tilting generates a corrective or alarm signal to the hockey player. (i.e. keep your head up)

Figure 6:
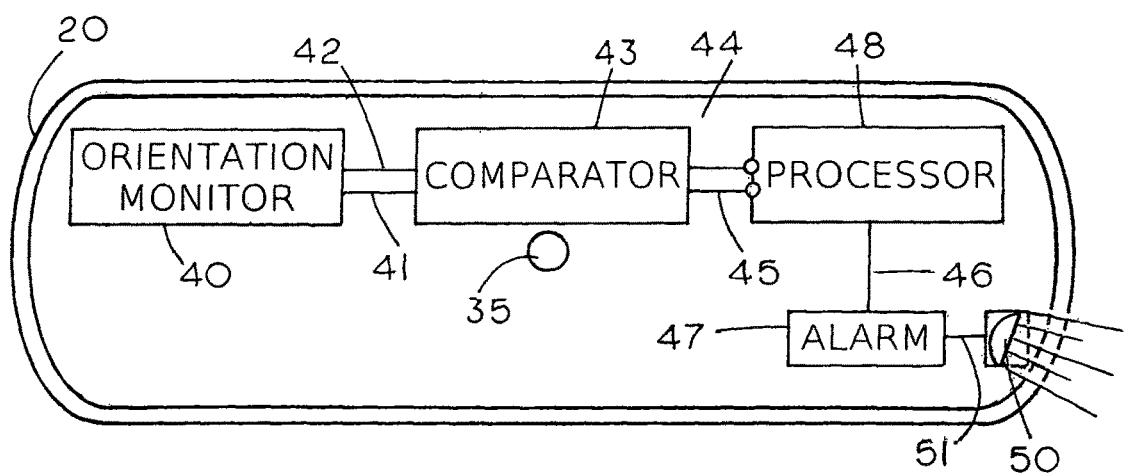
FIG. 6 is a schematic diagram of a peripheral visual trainer having an orientation monitor, a comparator and a processor located in the peripheral visual trainer with an alarm to alert a person when head tilt has caused the hockey player to bring an object that should be viewed in the person's peripheral viewing region into the person's central viewing region.

FIG. 6 shows an open view of peripheral visual trainer 20 including the orientation monitor 40 that connects to a comparator 43 through leads 41 and 42. In this example the comparator compares the signal from orientation monitor 40 to the reference head position signal stored in processor 48. If the comparator detects a difference a signal is sent to alarm 47 through lead 46 with the alarm 47 comprising either a visual, a vibratory alarm or audible alarm or both that alerts the hockey player to look up. For example, if the hockey player does not respond to a visual alarm by tilting his or her head upward a second audible alarm may sound. In this example alarm 47 sends a signal to light 50 that directs a light beam 52 forward into the central viewing region of the person wearing the visual trainer 20 thereby alerting the person that head tilt has occurred and the head tilt needs to be corrected. The light may be a flashing light or it may be a light that remains on until the person has brought his or her head back to the reference head position.

Figure 7:
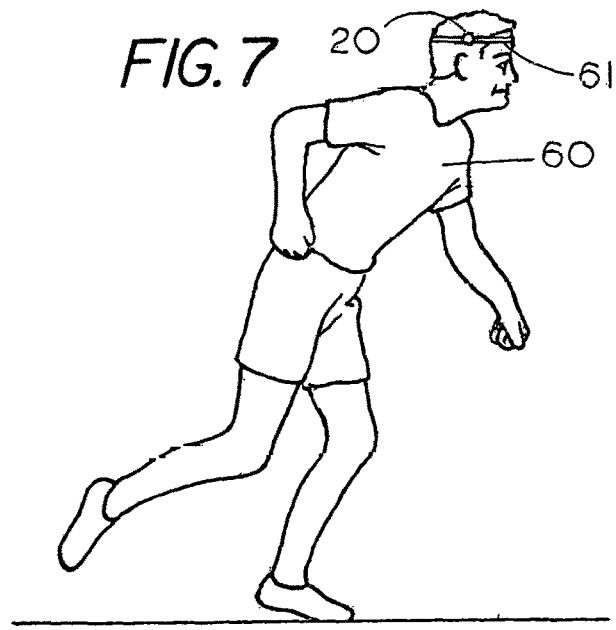
FIG. 7 shows a runner with a peripheral visual trainer mounted on the side of the head and supported thereon with an elastic band.

FIG. 7 provides another example of an athlete with a peripheral visual trainer 20. In this example the peripheral visual trainer 20 is useful for training a runner to use both peripheral vision and central vision for viewing object in front of the runner 60. In this example an elastic headband 61 secures the peripheral visual trainer 62 to the side of the runners head and the peripheral visual trainer 20 sends a signal based on head tilting or head deviation from a reference head position that is established as illustrated by the process described herein. Likewise other information may be programmed into the peripheral visual trainer 20, for example the runners processor may be, set so that in addition to alarm for head orientation an alarm is activated if the runner speed is more or less than a programmed speed.

As described herein the invention include a method of training a person having central vision and peripheral vision to simultaneously use the central vision to view an object in a central vision viewing region (CVR) and the peripheral vision to view an other object in a peripheral viewing region (PVR) without head tilting to bring objects in the peripheral viewing region into the central viewing region. The training is brought about mounting an orientation monitor to a head of a person and having the person look straight ahead at an object in the central vision-viewing region to establish a reference head position or head angle with respect to the horizon. This is position where an object located in the central vision-viewing region and another object located in the peripheral vision-viewing region can be simultaneously viewed in their respective viewing regions without head tilting. Once the reference head position is determined one sets the reference head position angle in the orientation monitor, which may be set in the processor through switches 32 and 33. In the next step of the training process one determining if the head position angle of the person deviates from the reference head position angle as the person moves about such that an object in the peripheral viewing region (PVR) is visible in the central vision viewing region (CVR). If head deviation is detected the peripheral vision trainer 20 sends a signal to alert the person to tilt his or her head so that objects can be viewed in both the central viewing region and the and in the peripheral viewing region without having change head position. For example, a flashing light that the player can visually detect or in other cases the alarm may be an audible sound that the player can hear as the player skates along the ice.

In the example shown the orientation monitor 40 is shown mounted on the side of the head of the user to measure downward tilt or pitch of the users head, however, orientation monitor 40 may be mounted on other portions of the users head such as top or front as long as the pitch or tilt of the users head from the reference head position can be determined. For example, a monitor using a global positioning system (GPS) can be used to provide selective information on head tilt that cause the person to view an object using central vision rather than peripheral vision as long as reference information regarding head tilt or pitch can be determined from the orientation monitor.

While the peripheral visual trainer 20 has been describe in relation to a hockey player no limitation is intended thereto as the peripheral visual trainer 20 can also be used to train athletes in other sports. For example, in golf it is important that the athlete look at the ball rather than the surroundings.

The athlete may set the orientation monitor 40 in the peripheral visual trainer 20 such that head movement sends an alerts or alarm, which indicates the golfer has taken his or her eyes off the ball. In some cases the peripheral visual trainer 20 may be set to monitor other information such as distance, latitude, longitude or any other relevant parameters. Other uses or applications for the peripheral visual trainer 20 and the method of peripheral visual training may be done without departing from the spirit and scope of the invention.

We claim:

1. A peripheral vision trainer comprising:
   a helmet responsive to head motion of an athlete;
   an orientation monitor secured to said helmet, said orientation monitor responsive to a downward head tilt of the athlete from a reference head position of the athlete, and rotationally positionable with respect to the helmet to set the reference head position for the athlete based on the athlete viewing along a horizontal line extending from a fovea of the eye of the athlete; and
   an alarm activated when the downward head tilt of the athlete from the reference head position of the athlete is detected, said alarm alerting the athlete that an object viewable in the peripheral vision viewing region of the athlete has become viewable in the central vision viewing region of the athlete.

2. The peripheral vision trainer of claim 1 where the orientation monitor comprises either a level indicator or a gyroscope.

3. The peripheral vision trainer of claim 1 where the orientation monitor comprises at least one global positioning sensor (GPS).

4. The peripheral vision trainer of claim 1 where the orientation monitor comprises a liquid level switch.

5. The peripheral vision trainer of claim 1 including a processor and the alarm once activated remains on until the head of the athlete returns to the reference head position.

6. The peripheral vision trainer of claim 1 wherein a second alarm is activated if the head of the athlete is not returned to the reference head position.

7. The peripheral vision trainer of claim 1 including a processor for setting the orientation monitor to a reference head position where the orientation monitor is only responsive to a pitch of the head of the athlete.

8. The peripheral vision trainer of claim 1 wherein the alarm comprises a vibratory alarm.

9. A method of training a person having a central vision and a peripheral vision to simultaneously use the central vision to view a first object in a central vision viewing region and the peripheral vision to view a second object in a peripheral viewing region comprising:
   mounting an orientation monitor to a head of a person;
   having the person look at a reference object in the central vision viewing region of the person to establish a reference head position with respect to the horizon where the reference object is viewable in the central vision viewing region of the person and the second object is viewable in the peripheral vision viewing region of the person;
   setting the reference head position in the orientation monitor;
   determining if a head position of the person has tilted downward from the reference head position as the person moves about; and
   sending an alarm to the person if the head position has tilted downward from the reference head position to alert the person to bring the head position back to reference head position.

10. The method of claim 9 wherein the step to establish the reference head position the person looks along a central axis in the central vision viewing area when the central axis is parallel to a horizon.

11. The method of claim 9 including the step of mounting the peripheral vision trainer to a head of the person to detect pitch of the persons head.

12. The method of claim 9 including mounting the peripheral vision trainer to the person and determining the reference head position based on a natural head angle of the person when the person looks forward along a horizontal line.

13. The method of claim 9 wherein determining if a head position of the person deviates from the reference head position angle as the person moves includes determining a natural viewing angle of the head of the person.

14. The method of claim 9 including the step of setting the reference head position in a processor in communication with an orientation monitor as the person looks along a horizontal line extending forward from a fovea of the person.

* * * * *